(12) United States Patent
Ho (10) Patent No.: US 10,938,074 B2
(45) Date of Patent: Mar. 2, 2021

(54) ELECTRONIC DEVICE, DISCHARGING METHOD FOR THE SAME, AND CHARGING METHOD FOR THE SAME

(71) Applicant: GETAC TECHNOLOGY CORPORATION, Hsinchu County (TW)

(72) Inventor: Chi-En Ho, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 546 days.

(21) Appl. No.: 15/786,520

(22) Filed: Oct. 17, 2017

(65) Prior Publication Data

US 2019/0115628 A1 Apr. 18, 2019

(51) Int. Cl.
*H01M 10/42* (2006.01)
*H01M 10/46* (2006.01)
*H01M 10/44* (2006.01)
*H02J 7/00* (2006.01)

(52) U.S. Cl.
CPC ......... *H01M 10/425* (2013.01); *H01M 10/44* (2013.01); *H01M 10/46* (2013.01); *H02J 7/0013* (2013.01); *H02J 2007/0067* (2013.01)

(58) Field of Classification Search
CPC .... H01M 10/425; H01M 10/44; H01M 10/46; H01M 10/42; H02J 7/0013; H02J 7/00; H02J 2007/0067
USPC ......................................................... 320/128
See application file for complete search history.

(56) References Cited

U.S. PATENT DOCUMENTS

| | | | | |
|---|---|---|---|---|
| 7,734,317 | B2* | 6/2010 | Patel ..................... | H02J 7/0025 455/572 |
| 8,773,077 | B1* | 7/2014 | Elmes ................... | H02J 7/0072 320/128 |
| 2004/0155627 | A1* | 8/2004 | Stanesti ............... | H02J 7/0018 320/127 |
| 2004/0257042 | A1* | 12/2004 | Liu ..................... | H01M 10/441 320/130 |
| 2006/0139005 | A1* | 6/2006 | Niculae ................ | H02J 7/0013 320/132 |
| 2010/0279166 | A1* | 11/2010 | Tseng ................... | H01M 10/42 429/123 |
| 2011/0260689 | A1* | 10/2011 | Kano .................... | H02J 7/0022 320/128 |
| 2017/0142656 | A1* | 5/2017 | Hong ................ | H04W 52/0235 |

* cited by examiner

*Primary Examiner* — Richard Isla
*Assistant Examiner* — Dung V Bui (57) ABSTRACT

An electronic device includes a power transmit port, a first battery unit, a second battery unit, a first voltage-controlled conducting circuit, a first selective conducting circuit, a second voltage-controlled conducting circuit, a second selective conducting circuit and a processing unit. The first and second voltage-controlled conducting circuit connects the corresponding battery unit to the power transmit port in electric when the voltage of the corresponding battery unit is higher than the voltage of the power transmit port. The first selective conducting circuit connects the first battery unit to the power transmit port in electric according to a first turn-on signal. The second selective conducting circuit connects the second battery unit to the power transmit port in electric according to a second turn-on signal. The processing unit generates the first turn-on signal and the second turn-on signal in selective.

21 Claims, 6 Drawing Sheets

ELECTRONIC DEVICE, DISCHARGING METHOD FOR THE SAME, AND CHARGING METHOD FOR THE SAME

BACKGROUND OF THE INVENTION

Field of the Invention

The present invention relates to charging and discharging technology and, more particularly, to an electronic device, a discharging method for the same, and a charging method for the same.

Description of the Prior Art

Along with technological advancement and development, electronic devices are not only in increasingly wider use but are also usually lightweight, compact, and portable. In general, to meet the requirement for portability, electronic devices usually use a battery unit as a main power source for maintaining their operation.

The volume of the battery units is limited by that of the electronic devices. Owing to their volumetric limit, the battery units are operable only within a specific effective power supply duration, and the effective power supply duration is never sufficient for heavy users of electronic devices. An electronic device with two battery units was launched into market and is characterized by enhanced flexibility of operation to extend the operable duration.

The two battery units of the aforesaid electronic device differ in battery capacity. In general, among the two battery units, the one with a large series number is usually a primary battery of the electronic device, whereas the one with a small series number is usually a secondary battery of the electronic device. With conventional charging and discharging methods, the electronic device always discharges the battery unit with a higher voltage first and charges the battery unit with a lower voltage first. The primary battery has a larger series number and thus has a higher voltage. Therefore, regarding the conventional electronic device, the primary battery is always discharged earlier than the secondary battery. Moreover, battery units with a larger series number takes up more space, and thus the electronic device cannot be downsized.

SUMMARY OF THE INVENTION

In an embodiment, an electronic device comprises a power transmitting end, first battery unit, second battery unit, first voltage-controlled conducting circuit, first selective conducting circuit, second voltage-controlled conducting circuit, second selective conducting circuit, and processing unit. The first voltage-controlled conducting circuit is coupled between first battery unit and the power transmitting end to electrically connect the first battery unit to the power transmitting end if the first battery unit has a higher voltage than the power transmitting end. The first selective conducting circuit is coupled between first battery unit and the power transmitting end to electrically connect the first battery unit to the power transmitting end according to a first start signal. The second voltage-controlled conducting circuit is coupled between the second battery unit and the power transmitting end to electrically connect the second battery unit to the power transmitting end if the second battery unit has a higher voltage than the power transmitting end. The second selective conducting circuit is coupled between the second battery unit and the power transmitting end to electrically connect the second battery unit to the power transmitting end according to a second start signal. The processing unit detects the first battery unit and the second battery unit to selectively generate the first start signal and the second start signal.

In an embodiment, a discharging method comprises the steps of: turning on the first voltage-controlled path according to a voltage between two ends of a first voltage-controlled path disposed between a first battery unit and a power transmitting end to discharge the first battery unit through the first voltage-controlled path; turning on the second voltage-controlled path according to a voltage between two ends of a second voltage-controlled path disposed between a second battery unit and the power transmitting end to discharge the second battery unit through the second voltage-controlled path; detecting for the first battery unit and the second battery unit; turning on a first switch path disposed between the first battery unit and the power transmitting end and severing a second switch path disposed between the second battery unit and the power transmitting end upon detection that the voltage of the first battery unit is higher than or equal to the voltage of the second battery unit, thereby discharging the first battery unit through the first switch path; and turning on the second switch path and severing the first switch path upon detection that the voltage of the second battery unit is higher than the voltage of the first battery unit, thereby discharging the second battery unit through the second switch path.

In an embodiment, a charging method comprises the steps of: detecting a first battery unit and a second battery unit of an electronic device; turning on a first switch path between the first battery unit and a power transmitting end and turning off a second switch path between the second battery unit and the power transmitting end if a power level of the first battery unit is not higher than a predetermined power level difference of a power level of the second battery unit so that the first battery unit receives an external power from the power transmitting end through the first switch path until the power level of the first battery unit is higher than the predetermined power level difference of the power level of the second battery unit; and turning on the second switch path and severing the first switch path if the power level of the first battery unit is higher than the predetermined power level difference of the power level of the second battery unit so that the second battery unit receives the external power from the power transmitting end through the second switch path until the power level of the second battery unit is equal to the power level of the first battery unit.

An electronic device, a discharging method for the same, and a charging method for the same, which are provided according to an embodiment of the present invention, have essential technical features described below. Two selective conducting circuits control a specified one of two battery units to undergo discharging and charging and thus enhance the efficiency of the two battery units. Two voltage-controlled conducting circuits allow the two battery units to be parallel-connected to a power transmitting end to undergo a discharging operation and thus ensure that at least one of the battery units is discharged through the voltage-controlled conducting circuits despite an ongoing switch between the selective conducting circuits or separation of one of the battery units from the electronic device, so as to maintain system stability of the electronic device. Furthermore, the electronic device, the discharging method for the same, and the charging method for the same, which are provided according to an embodiment of the present invention, are characterized in that the two battery units have equal battery capacity to allow a reduction in the required volume of the electronic device.

The features and advantages of the present invention are detailed hereinafter with reference to the preferred embodiments. The detailed description is intended to enable persons skilled in the art to gain insight into the technical contents disclosed herein and implement the present invention accordingly. In particular, persons skilled in the art can easily understand the objectives and advantages of the present invention by referring to the disclosure of the specification, the claims, and the accompanying drawings.

DETAILED DESCRIPTION OF THE EMBODIMENTS

Figure 1:
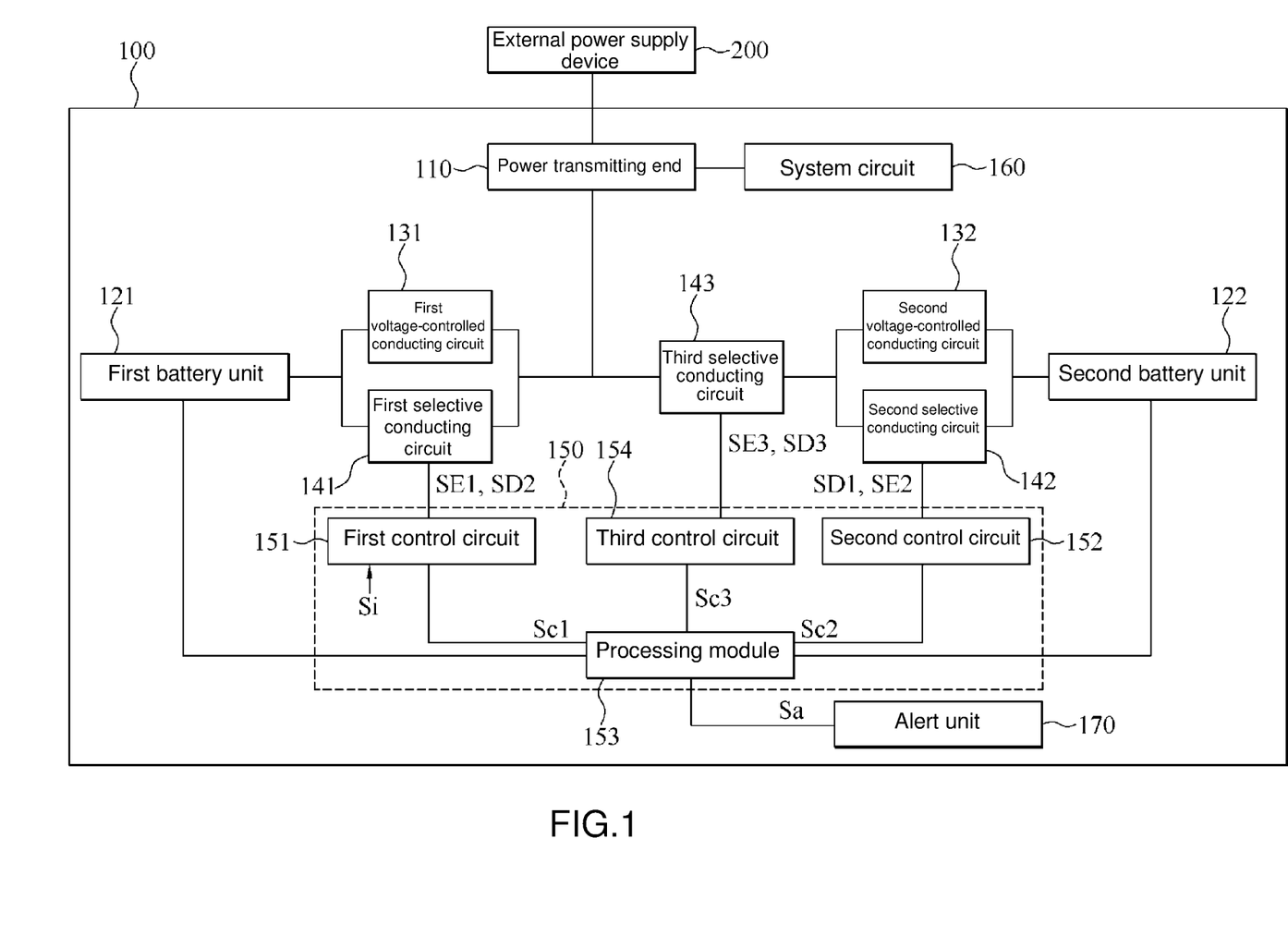
FIG. 1 is a block diagram of an electronic device according to an embodiment of the present invention.

FIG. 1 is a block diagram of an electronic device according to an embodiment of the present invention. Referring to FIG. 1, an electronic device 100 comprises a power transmitting end 110, at least two battery units, at least two voltage-controlled conducting circuits, at least two selective conducting circuits, and a processing unit 150.

The description below is exemplified by two battery units (a first battery unit 121 and a second battery unit 122), two voltage-controlled conducting circuits (a first voltage-controlled conducting circuit 131 and a second voltage-controlled conducting circuit 132), and at least two selective conducting circuits (a first selective conducting circuit 141 and a second selective conducting circuit 142), but the aforesaid disclosed quantity of the battery units, voltage-controlled conducting circuits, and selective conducting circuits is not restrictive of the present invention. In some embodiments, the quantity of the voltage-controlled conducting circuits and the quantity of the selective conducting circuits corresponds to the quantity of the battery units. For instance, if the battery units are in the number of N, both the voltage-controlled conducting circuits and the selective conducting circuits are in the number of N, but the present invention is not limited thereto.

In some embodiments, the first battery unit 121 has substantially the same specifications as the second battery unit 122. For instance, the first battery unit 121 and the second battery unit 122 each comprise battery components in a 1-series, 1-parallel (1S1P) configuration.

The first voltage-controlled conducting circuit 131 is parallel-connected to the first selective conducting circuit 141. The first voltage-controlled conducting circuit 131 and the first selective conducting circuit 141 are coupled between the first battery unit 121 and the power transmitting end 110. The second voltage-controlled conducting circuit 132 is parallel-connected to the second selective conducting circuit 142. The second voltage-controlled conducting circuit 132 and the second selective conducting circuit 142 are coupled between the second battery unit 122 and the power transmitting end 110. The processing unit 150 is coupled to the first battery unit 121, the second battery unit 122, the first selective conducting circuit 141, and the second selective conducting circuit 142.

The first voltage-controlled conducting circuit 131 has a first voltage-controlled path. The first voltage-controlled path is disposed between first and second ends of the first voltage-controlled conducting circuit 131. The first voltage-controlled conducting circuit 131 determines whether to turn on the first voltage-controlled path according to the voltage between the two ends of the first voltage-controlled path. The first end of the first voltage-controlled conducting circuit 131 is coupled to the first battery unit 121, whereas the second end of the first voltage-controlled conducting circuit 131 is coupled to the power transmitting end 110. Therefore, the first voltage-controlled path is disposed between the first battery unit 121 and the power transmitting end 110. The first voltage-controlled conducting circuit 131 determines whether to turn on the first voltage-controlled path according to the voltage of the first battery unit 121 and the voltage of the power transmitting end 110.

The second voltage-controlled conducting circuit 132 has a second voltage-controlled path. The second voltage-controlled path is disposed between first and second ends of the second voltage-controlled conducting circuit 132. The second voltage-controlled conducting circuit 132 determines whether to turn on the second voltage-controlled path according to the voltage between the two ends of the second voltage-controlled path. The first end of the second voltage-controlled conducting circuit 132 is coupled to the second battery unit 122, whereas the second end of the second voltage-controlled conducting circuit 132 is coupled to the power transmitting end 110. Therefore, the second voltage-controlled path is disposed between the second battery unit 122 and the power transmitting end 110. The second voltage-controlled conducting circuit 132 determines whether to turn on the second voltage-controlled path according to the voltage of the second battery unit 122 and the voltage of the power transmitting end 110.

The first selective conducting circuit 141 has a first switch path. The first switch path is disposed between first and second ends of the first selective conducting circuit 141. The first selective conducting circuit 141 is controlled by the processing unit 150 and determines whether to turn on the first switch path according to a signal generated from the processing unit 150. The first end of the first selective conducting circuit 141 is coupled to the first battery unit 121, whereas the second end of the first selective conducting circuit 141 is coupled to the power transmitting end 110. The control end of the first selective conducting circuit 141 is coupled to the processing unit 150. Therefore, the first switch path is disposed between the first battery unit 121 and the power transmitting end 110.

The second selective conducting circuit 142 has a second switch path. The second switch path is disposed between first and second ends of the second selective conducting circuit 142. The second selective conducting circuit 142 is controlled by the processing unit 150 and determines whether to turn on the second switch path according to a signal generated from the processing unit 150. The first end of the second selective conducting circuit 142 is coupled to the second battery unit 122, whereas the second end of the second selective conducting circuit 142 is coupled to the power transmitting end 110. The control end of the second selective conducting circuit 142 is coupled to the processing unit 150. Therefore, the second switch path is disposed between the second battery unit 122 and the power transmitting end 110.

In an embodiment, the electronic device 100 further comprises a system circuit 160 which the power transmitting end 110 is connected to. The power transmitting end 110 supplies a power to the system circuit 160 to maintain operation of the system circuit 160. The source of the power supplied by the power transmitting end 110 to the system circuit 160 is a battery power supplied by the first battery unit 121 and/or the second battery unit 122 in the electronic device 100 through the first voltage-controlled path, second voltage-controlled path, first switch path and/or second switch path or an external power supplied by an external power supply device 200, as opposed to the electronic device 100, to the power transmitting end 110 of the electronic device 100. The external power supplied by the external power supply device 200 is further transmitted by the power transmitting end 110 of the electronic device 100 to the first battery unit 121 and/or the second battery unit 122 in the electronic device 100 to charge the first battery unit 121 and/or the second battery unit 122.

The processing unit 150 detects the first battery unit 121 and the second battery unit 122. The processing unit 150 selectively generates a first start signal SE1, second start signal SE2, first shutdown signal SD1 and/or second shutdown signal SD2 according to any embodiment of a charging method of the present invention and any embodiment of a discharging method of the present invention to control the charging and discharging operation of the first battery unit 121 and/or the second battery unit 122, thereby not only optimizing the performance of the first battery unit 121 and the second battery unit 122 but also enhancing the system stability of the electronic device 100.

Figure 2:
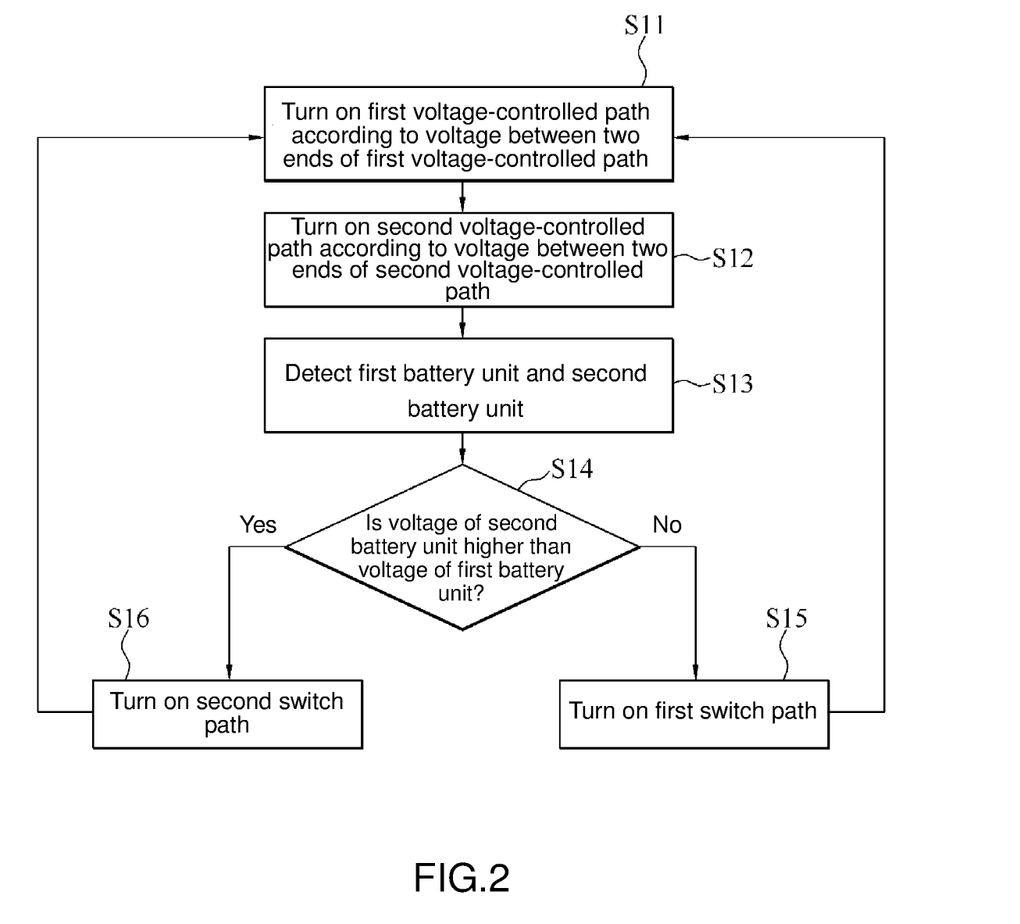
FIG. 2 is a schematic view of the process flow of a discharging method according to an embodiment of the present invention.

FIG. 2 is a schematic view of the process flow of a discharging method according to an embodiment of the present invention. Referring to FIG. 1 and FIG. 2, in an embodiment of the discharging method, the first voltage-controlled conducting circuit 131 of the electronic device 100 turns on the first voltage-controlled path according to the voltage between the two ends of the first voltage-controlled path (step S11), whereas the second voltage-controlled conducting circuit 132 of the electronic device 100 turns on the second voltage-controlled path according to the voltage between the two ends of the second voltage-controlled path (step S12), and the processing unit 150 of the electronic device 100 detects the state of the first battery unit 121 and the state of the second battery unit 122 (step S13).

In an embodiment of step S11, the first voltage-controlled conducting circuit 131 turns on the first voltage-controlled path if the voltage at its first end is higher than the voltage at its second end but turns off the first voltage-controlled path if the voltage at its first end is lower than or equal to the voltage at its second end. Therefore, the first battery unit 121 is electrically connected to the power transmitting end 110 by the first voltage-controlled path if the voltage of the first battery unit 121 is higher than the voltage of the power transmitting end 110 but cannot be electrically connected to the power transmitting end 110 by the first voltage-controlled path if the voltage of the first battery unit 121 is lower than or equal to the voltage of the power transmitting end 110.

In another embodiment of step S11, it is only when the voltage of the first battery unit 121 is higher than the voltage of the power transmitting end 110 by a first voltage threshold that the first voltage-controlled conducting circuit 131 turns on the first voltage-controlled path. The first voltage threshold is also known as the turn-on critical value of the first voltage-controlled path. In some embodiments, the first voltage threshold ranges from 0.15 volt to 0.7 volt, but the present invention is not limited thereto.

In an embodiment of step S12, the second voltage-controlled conducting circuit 132 turns on the second voltage-controlled path if the voltage at its first end is higher than the voltage at its second end but turns off the second voltage-controlled path if the voltage at its first end is lower than or equal to the voltage at its second end. Therefore, the second battery unit 122 is electrically connected to the power transmitting end 110 by the second voltage-controlled path if the voltage of the second battery unit 122 is higher than the voltage of the power transmitting end 110 but cannot be electrically connected to the power transmitting end 110 by the second voltage-controlled path if the voltage of the second battery unit 122 is lower than or equal to the voltage of the power transmitting end 110.

In another embodiment of step S12, it is only when the voltage of the second battery unit 121 is higher than the voltage of the power transmitting end 110 by a second voltage threshold that the second voltage-controlled conducting circuit 132 turns on the second voltage-controlled path. The second voltage threshold is also known as the turn-on critical value of the second voltage-controlled path. In some embodiments, the second voltage threshold ranges from 0.15 volt to 0.7 volt, but the present invention is not limited thereto.

In an embodiment of step S11 and step S12, the first battery unit 121 and the second battery unit 122 are parallel-connected to the power transmitting end 110 if the first voltage-controlled conducting circuit 131 turns on the first voltage-controlled path and the second voltage-controlled conducting circuit 132 turns on the second voltage-controlled path.

In an embodiment, both the first voltage-controlled conducting circuit 131 and the second voltage-controlled conducting circuit 132 are unidirectional current circuits, such as diodes, which conduct current in one direction but not the other. The first voltage-controlled conducting circuit 131 conducts current from the first end to the second end only, whereas the second voltage-controlled conducting circuit 132 conducts current from the first end to the second end only. Therefore, the first voltage-controlled conducting circuit 131 conducts current from the first battery unit 121 to the power transmitting end 110 only, whereas the second voltage-controlled conducting circuit 132 conducts current from the second battery unit 122 to the power transmitting end 110. Therefore, the first voltage-controlled path of the first voltage-controlled conducting circuit 131 serves as a discharging path whereby the first battery unit 121 is discharged, that is, power is conducted therefrom to the power transmitting end 110, whereas the second voltage-controlled path of the second voltage-controlled conducting circuit 132 serves as a discharging path whereby the second battery unit 122 is discharged, that is, power is conducted therefrom to the power transmitting end 110.

In an embodiment, the first battery unit 121 is built in the electronic device 100, whereas the second battery unit 122 is separably coupled to the electronic device 100. Therefore, the second battery unit 122 can be easily taken out and replaced; as a result, the odds are that the second battery unit 122 will be separated from the electronic device 100 when hit. Therefore, in some embodiments, to ensure that the first battery unit 121 supplies power to the power transmitting end 110 speedily, the first voltage-controlled conducting circuit 131 is a unidirectional current circuit capable of switching fast, such as a Schottky diode or a fast diode. Similarly, the second voltage-controlled conducting circuit 132 is also a unidirectional current circuit capable of switching fast.

In an embodiment of step S13, the processing unit 150 detects the voltage of the first battery unit 121 and the voltage of the second battery unit 122 and selects one of the first and second battery units 121, 122 to discharge according to the voltage of the first battery unit 121 and the voltage of the second battery unit 122 (step S14).

In an embodiment of step S14, the processing unit 150 causes the first battery unit 121 to discharge, that is, conduct power therefrom to the power transmitting end 110, through the first switch path of the first selective conducting circuit 141 if the processing unit 150 detects that the voltage of the first battery unit 121 is higher than or equal to the voltage of the second battery unit 122 (step S15). Furthermore, the processing unit 150 causes the second battery unit 122 to discharge, that is, conduct power therefrom to the power transmitting end 110, through the second switch path of the second selective conducting circuit 142 if the processing unit 150 detects that the voltage of the second battery unit 122 is higher than the voltage of the first battery unit 121 (step S16). Therefore, the processing unit 150 selects one of the first and second battery units 121, 122 to discharge, whichever has a higher voltage. Furthermore, the processing unit 150 treats the first battery unit 121 as a primary discharging battery and thus causes the first battery unit 121 to discharge as soon as the second battery unit 122 discharges and has its voltage reduced to equal that of the first battery unit 121, but the present invention is not limited thereto.

In another embodiment of step S14, the processing unit 150 performs step S15 after detecting that the voltage of the first battery unit 121 is higher than the voltage of the second battery unit 122 by the first voltage threshold and performs step S16 after detecting that the voltage of the second battery unit 122 is higher than the voltage of the first battery unit 121 by the second voltage threshold. Therefore, the processing unit 150 causes the first battery unit 121 and the second battery unit 122 to take turns discharging and thus constrains the difference between the voltage of the first battery unit 121 and the voltage of the second battery unit 122.

In an embodiment, the first voltage threshold is equal to the second voltage threshold. In some embodiments, both the first voltage threshold and the second voltage threshold are 0.2 volt.

In an embodiment of step S14, if the initial voltage of the first battery unit 121 equals the initial voltage of the second battery unit 122, the processing unit 150 selects the first battery unit 121 to discharge, that is, performs step S15. Afterward, if the processing unit 150 detects that the voltage of the first battery unit 121 is lower than the second voltage threshold of the voltage of the second battery unit 122 because of a discharge of the first battery unit 121, the processing unit 150 selects the second battery unit 122 to discharge (that is, performs step S16). Then, if the processing unit 150 detects that the voltage of the second battery unit 122 is lower than the first voltage threshold of the voltage of the first battery unit 121 because of a discharge of the second battery unit 122, the processing unit 150 selects the first battery unit 121 to discharge (that is, performs step S15 again) and carries out the discharging method by the aforesaid alternation rule and sequence.

For instance, assuming that both the first voltage threshold and the second voltage threshold are 0.2 volt and both the voltage of the first battery unit 121 and the voltage of the second battery unit 122 are fully-charged voltage, say, 4.2 volts, the processing unit 150 may choose to perform step S15 first. After detecting that the voltage of the first battery unit 121 has dropped to 4.0 volts, the processing unit 150 performs step S16 because the difference between the voltage of the first battery unit 121 and the voltage of the second battery unit 122 has reached the second voltage threshold, thereby allowing the voltage of the second battery unit 122 to begin dropping from 4.2 volts gradually. Before it detects that the voltage of the second battery unit 122 drops to 3.8 volts, the processing unit 150 performs step S15 because the difference between the voltage of the second battery unit 122 and the voltage of the first battery unit 121 has reached the first voltage threshold. Therefore, the discharging operation takes place according to the aforesaid sequence.

In an embodiment of step S15, the processing unit 150 not only generates and sends the first start signal SE1 to the first selective conducting circuit 141 but also generates and sends the first shutdown signal SD1 to the second selective conducting circuit 142 to enable the first selective conducting circuit 141 to turn on the first switch path according to the first start signal SE1 and enable the second selective conducting circuit 142 to sever the second switch path according to the first shutdown signal SD1. In an embodiment of step S16, the processing unit 150 not only generates and sends the second start signal SE2 to the second selective conducting circuit 142 but also generates and sends the second shutdown signal SD2 to the first selective conducting circuit 141 to enable the second selective conducting circuit 142 to turn on the second switch path according to the second start signal SE2 and enable the first selective conducting circuit 141 to sever the first switch path according to the second shutdown signal SD2.

Figure 3:
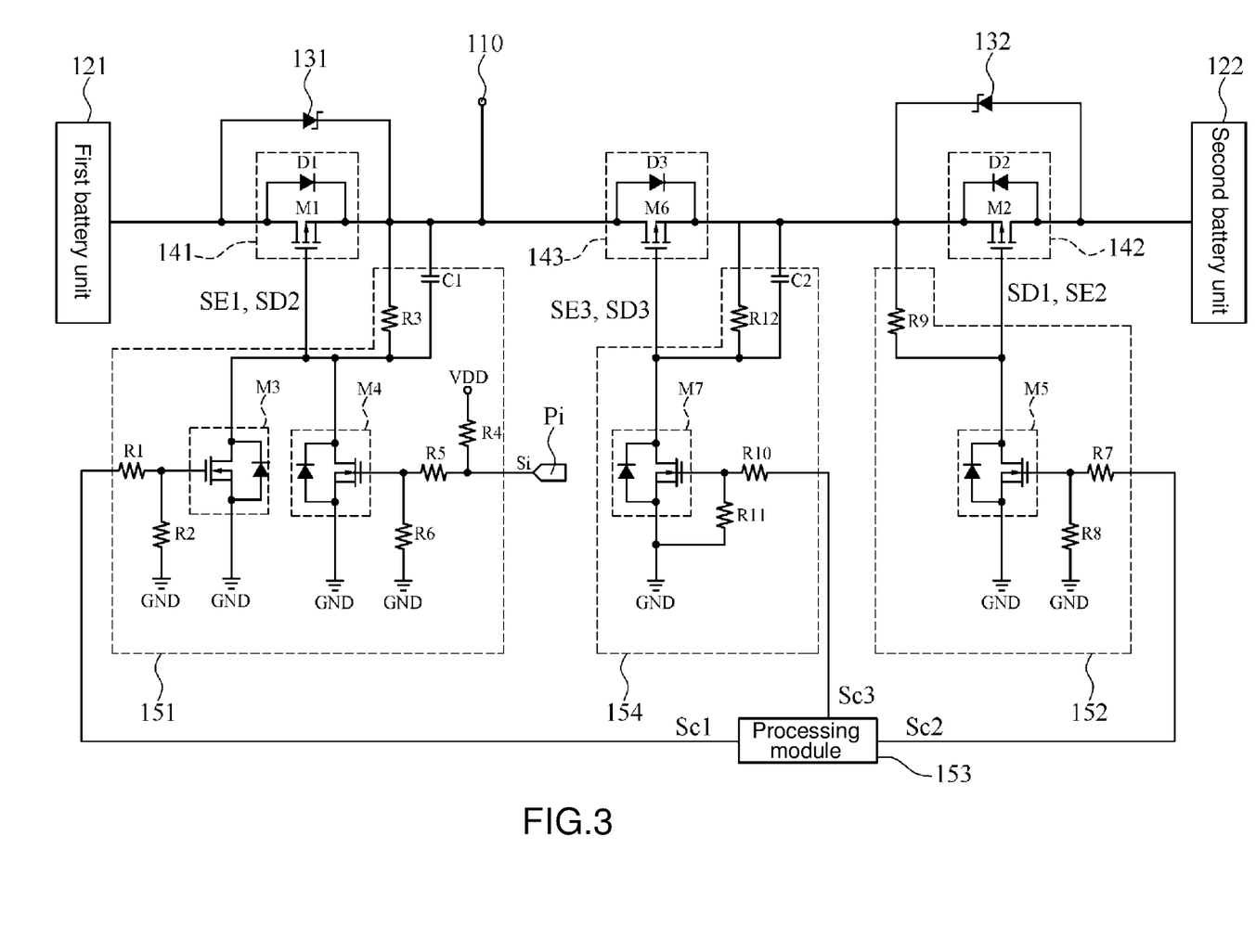
FIG. 3 is a schematic view of a circuit of the electronic device according to an embodiment of the present invention.

FIG. 3 is a schematic view of a circuit of the electronic device according to an embodiment of the present invention. Referring to FIG. 1 through FIG. 3, in an embodiment of the first selective conducting circuit 141 and the second selective conducting circuit 142, the first selective conducting circuit 141 comprises one or more switch components M1, whereas the second selective conducting circuit 142 comprises one or more switch components M2. The description below is exemplified by the first selective conducting circuit 141 comprising one switch component M1 and the second selective conducting circuit 142 comprising one switch component M2, but the present invention is not limited thereto.

The first end of the switch component M1 is coupled to the power transmitting end 110. The second end of the switch component M1 is coupled to the first battery unit 121. The control end of the switch component M1 is coupled to the processing unit 150. The first switch path is disposed between the first end and the second end of the switch component M1. The control end of the switch component M1 controls the start or shutdown of the first switch path. The first end of the switch component M2 is coupled to the power transmitting end 110. The second end of the switch component M2 is coupled to the second battery unit 122. The control end of the switch component M2 is coupled to the processing unit 150. The second switch path is disposed between the first end and the second end of the switch component M2. The control end of the switch component M2 controls the start or shutdown of the second switch path.

Therefore, in an embodiment of step S15, switch component M1 turns on the first switch path as soon as its control end receives the first start signal SE1 so that its first end is electrically connected to its second end, whereas switch component M2 severs the second switch path as soon as its control end receives the first shutdown signal SD1 so that its first end cannot be electrically connected to the second end. Therefore, the first battery unit 121 is discharged through the first switch path whereby power is conducted from the first battery unit 121 to the power transmitting end 110, but the second battery unit 122 cannot be discharged through the second switch path.

In an embodiment of step S16, switch component M1 severs the first switch path as soon as its control end receives the second shutdown signal SD2 so that its first end cannot be electrically connected to its second end, whereas switch component M2 turns on the second switch path as soon as its control end receives the second start signal SE2 so that its first end is electrically connected to its second end. Therefore, the second battery unit 122 is discharged through the second switch path whereby power is conducted from the second battery unit 122 to the power transmitting end 110, but the first battery unit 121 cannot be discharged through the first switch path.

In an embodiment of the first selective conducting circuit 141, the first selective conducting circuit 141 further comprises diode D1, and diode D1 is coupled between the first end and the second end of switch component M1. The anode of diode D1 is coupled to the second end of the switch component M1, whereas the cathode of diode D1 is coupled to the first end of the switch component M1. If the difference between the voltage of the first battery unit 121 and the voltage of the power transmitting end 110 causes diode D1 to turn on, the first battery unit 121 is discharged through diode D1 which allows current to be conducted from the first battery unit 121 to the power transmitting end 110. Diode D1 is a unidirectional conducting circuit; hence, diode D1 conducts current from its anode to its cathode and functions as a discharging path whereby the first battery unit 121 is discharged, that is, power is conducted therefrom to the power transmitting end 110.

Therefore, in an embodiment, not only is the first battery unit 121 discharged, that is, power is conducted therefrom to the power transmitting end 110, through the first voltage-controlled path of the first voltage-controlled conducting circuit 131 (if the first voltage-controlled path is turned on because of the voltage difference between the first battery unit 121 and the power transmitting end 110) and the first switch path of the first selective conducting circuit 141 (if the first selective conducting circuit 141 receives the first start signal SE1,) but the first battery unit 121 is also discharged, that is, power is conducted therefrom to the power transmitting end 110, through diode D1 in the first selective conducting circuit 141 (if diode D1 turns on because of the voltage difference between the first battery unit 121 and the power transmitting end 110.) Therefore, at least three discharging paths are available to the first battery unit 121, and one of them, that is, the first switch path of the first selective conducting circuit 141, can be controlled by the processing unit 150.

Similarly, in an embodiment, the second selective conducting circuit 142 further comprises diode D2, and diode D2 is coupled between the first end and the second end of switch component M2. The anode of diode D2 is coupled to the second end of the switch component M2, whereas the cathode of diode D2 is coupled to the first end of the switch component M2. If the voltage difference between the voltage of the second battery unit 122 and the voltage of the power transmitting end 110 causes diode D2 to turn on, the second battery unit 122 is discharged, that is, power is conducted therefrom to the power transmitting end 110, through diode D2. Diode D2 is a unidirectional conducting circuit; hence, diode D2 conducts current from its anode to its cathode and functions as a discharging path whereby the second battery unit 122 is discharged, that is, power is conducted therefrom to the power transmitting end 110.

Therefore, in an embodiment, not only is the second battery unit 122 discharged, that is, power is conducted therefrom to the power transmitting end 110, through the second voltage-controlled path of the second voltage-controlled conducting circuit 132 and the second switch path of the second selective conducting circuit 142 (if the second selective conducting circuit 142 receives the second start signal SE2,) but the second battery unit 122 is also discharged, that is, power is conducted therefrom to the power transmitting end 110, through diode D2 in the second selective conducting circuit 142 (if diode D2 turns on because of the voltage difference between the second battery unit 122 and the power transmitting end 110.)

In some embodiments, diode D1 is a parasitic diode which results from a circuit process of switch component M1, whereas diode D2 is a parasitic diode which results from a circuit process of switch component M2. Switch components M1, M2 are provided in the form of P-type transistors, but the present invention is not limited thereto. Switch components M1, M2 are provided in the form of N-type transistors and transmission gates (TG).

Figure 4:
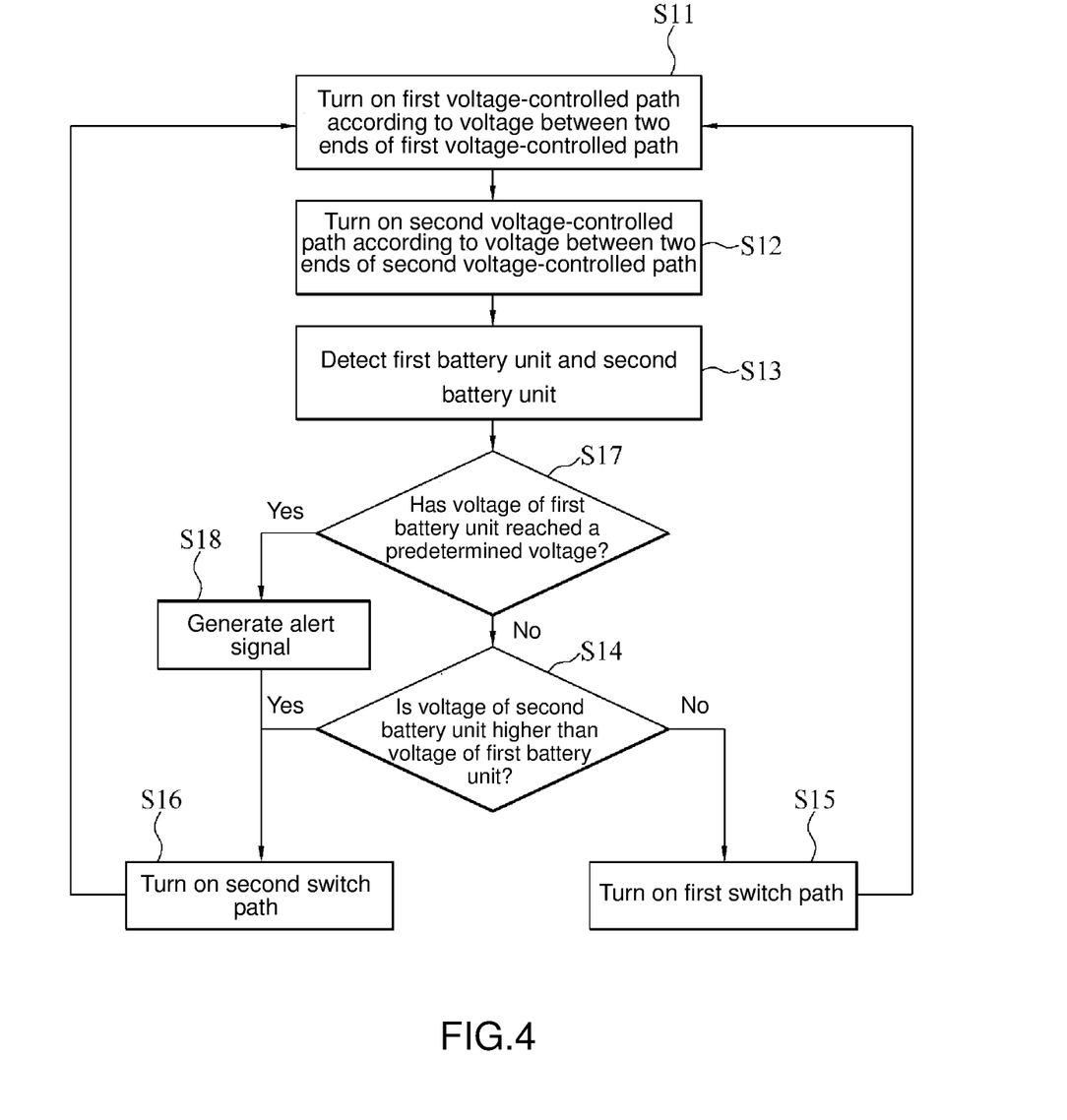
FIG. 4 is a schematic view of the process flow of the discharging method according to another embodiment of the present invention.

FIG. 4 is a schematic view of the process flow of the discharging method according to another embodiment of the present invention. Referring to FIG. 1 through FIG. 4, in an embodiment of the discharging method, after detecting that the voltage of the first battery unit 121 has dropped to a predetermined voltage (step S17), the processing unit 150 generates an alert signal Sa (step S18) to alert a user of the electronic device 100.

In an embodiment, the electronic device 100 further comprises an alert unit 170, and the alert unit 170 is coupled to the processing unit 150. The alert unit 170 generates an alert message according to the alert signal Sa sent from the processing unit 150. For instance, the alert unit 170 is a display component, such as a display screen or a light-emitting diode. After receiving the alert signal Sa, the alert unit 170 displays the alert message, flashes, or emits light in a specific color to alert the user. In a variant embodiment, the alert unit 170 is an audio unit, such as a buzzer, a speaker, or an amplifier, for generating a sound after receiving the alert signal Sa, so as to alert the user.

In an embodiment, the predetermined voltage is higher than the lowest voltage of the second battery unit 122 when its power level is discharged to 0%, and the predetermined voltage is higher than the lowest voltage of the first battery unit 121 when its power level is discharged to 0%. In some embodiments, the first battery unit 121 has substantially the same specifications as the second battery unit 122. For instance, the predetermined voltage is 3.3 volts, if both the lowest voltage of the first battery unit 121 and the lowest voltage of the second battery unit 122 are 3.0 volts.

In an embodiment of the discharging method, after detecting that the voltage of the first battery unit 121 has dropped to the predetermined voltage (step S17), the processing unit 150 performs step S16 to generate the second start signal SE2 for turning on the second selective conducting circuit 142 with a view to reducing the power level of the second battery unit 122 and retaining the power level of the first battery unit 121. Therefore, even if the power level of the second battery unit 122 drops to 0% or the user removes the second battery unit 122 for replacement, the electronic device 100 will still operate by the power of the first battery unit 121 and instruct the user to shut down the electronic device 100 normally, thereby preventing the electronic device 100 from shutting down suddenly.

Figure 5:
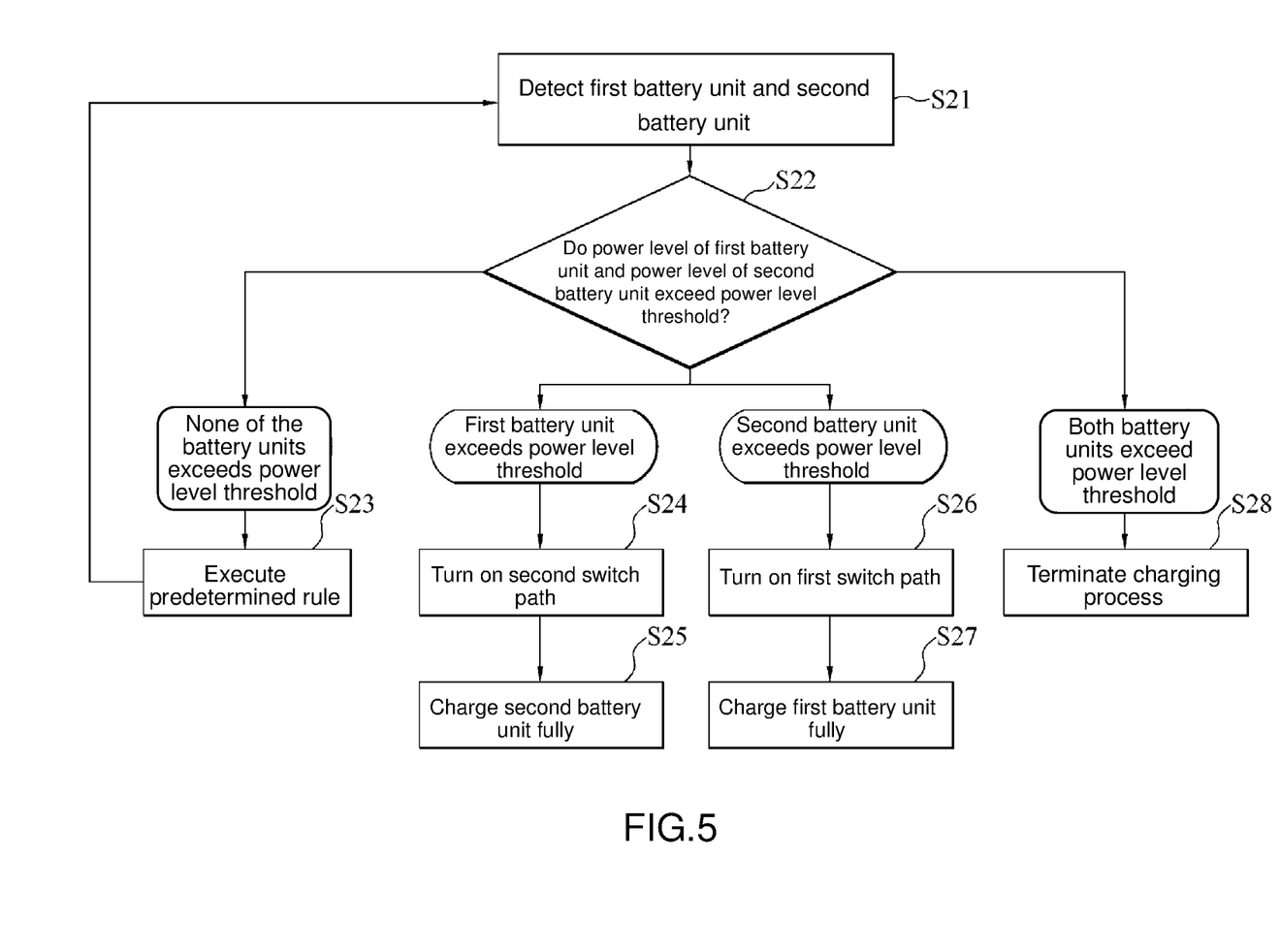
FIG. 5 is a schematic view of the process flow of a charging method according to an embodiment of the present invention.

FIG. 5 is a schematic view of the process flow of a charging method according to an embodiment of the present invention. Referring to FIG. 1 through FIG. 5, after receiving a charging signal, the processing unit 150 of the electronic device 100 charges the first battery unit 121 and the second battery unit 122 according to the charging method in any embodiment of the present invention. In an embodiment, the charging signal is generated as a result of electrical connection of the power transmitting end 110 of the electronic device 100 and the external power supply device 200.

In an embodiment of the charging method, the processing unit 150 of the electronic device 100 detects the first battery unit 121 and the second battery unit 122 (step S21) and selects an ensuing step to perform according to the power level of the first battery unit 121 and the power level of the second battery unit 122.

In an embodiment of the charging method, the processing unit 150 determines whether the power level of the first battery unit 110 exceeds a power level threshold, and determines whether the power level of the second battery unit 122 exceeds the power level threshold (step S22). The power level threshold is a parameter whereby the processing unit 150 determines whether the power level of the battery unit has finished charging. In some embodiments, the power level threshold is 95%, but the present invention is not limited thereto.

If the processing unit 150 determines that neither the power level of the first battery unit 121 nor the power level of the second battery unit 122 exceeds the power level threshold, the processing unit 150 generates the first start signal SE1 and the second start signal SE2 alternately according to the power level of the first battery unit 121, the power level of the second battery unit 122, a predetermined power level difference, and a predetermined rule (step S23). Therefore, the first battery unit 121 and the second battery unit 122 are charged alternately.

Figure 6:
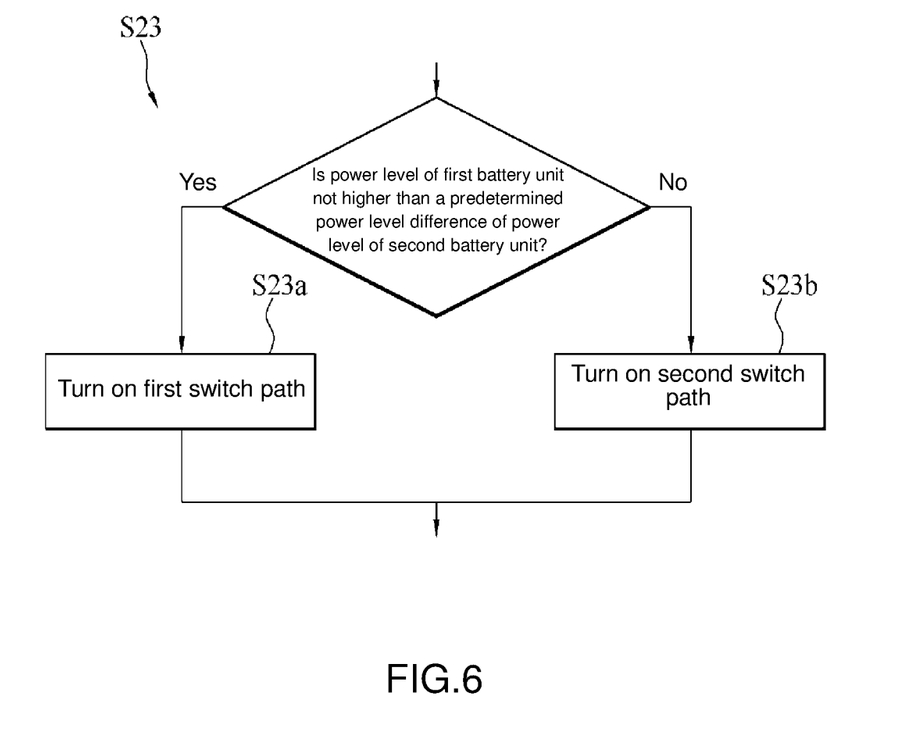
FIG. 6 is a schematic view of the process flow of step S23 in FIG. 5 according to an embodiment of the present invention.

FIG. 6 is a schematic view of the process flow of step S23 in FIG. 5 according to an embodiment of the present invention. Referring to FIG. 1 through FIG. 6, in an embodiment of the predetermined rule, if the power level of the first battery unit 121, as detected by the processing unit 150, is not higher than a predetermined power level difference of the power level of the second battery unit 122, the processing unit 150 turns on the first switch path of the first selective conducting circuit 141 so that the external power received by the power transmitting end 110 is used to charge the first battery unit 121 through the first switch path (step S23a). If the power level of the first battery unit 121, as detected by the processing unit 150, is higher than a predetermined power level difference of the power level of the second battery unit 122, the processing unit 150 turns on the second switch path of the second selective conducting circuit 142 so that the external power is used to charge the second battery unit 122 through the second switch path (step S23b).

In an embodiment of step S23a, the processing unit 150 not only sends the first start signal SE1 to the first selective conducting circuit 141 to turn on the first switch path but also sends the first shutdown signal SD1 to the second selective conducting circuit 142 to shut down the second switch path so that the first battery unit 121 receives the external power through the first switch path. The first switch path turns on continuously so that the first battery unit 121 is charged continuously with the external power until the power level of the first battery unit 121 is higher than the power level of the second battery unit 122 by a predetermined power level difference, and it is only when the power level of the first battery unit 121 is higher than the power level of the second battery unit 122 by a predetermined power level difference that the processing unit 150 stops turning on the first switch path.

In an embodiment, the processing unit 150 detects a power level difference between the first battery unit 121 and the second battery unit 122 and sends the second shutdown signal SD2 to the first selective conducting circuit 141 to sever the first switch path upon detection that the power level difference between the first battery unit 121 and the second battery unit 122 is equal to the predetermined power level difference.

In an embodiment of step S23b, the processing unit 150 not only sends the second start signal SE2 to the second selective conducting circuit 142 to turn on the second switch path but also sends the second shutdown signal SD1 to the first selective conducting circuit 141 to turn off the first switch path so that the second battery unit 122 receives the external power through the second switch path.

In an embodiment, the processing unit 150 detects a power level difference between the first battery unit 121 and the second battery unit 122 and sends the first shutdown signal SD1 to the second selective conducting circuit 142 to sever the second switch path upon detection of no power level difference between the first battery unit 121 and the second battery unit 122.

If the processing unit 150 determines that the power level of the first battery unit 121 exceeds the power level threshold and that the power level of the second battery unit 122 does not exceed the power level threshold, the processing unit 150 sends the second shutdown signal SD2 to sever the first switch path of the first selective conducting circuit 141 and sends the second start signal SE2 to turn on the second switch path of the second selective conducting circuit 142 so that the second battery unit 122 is charged with the external power through the second switch path (step S24). In an embodiment, after step S24, the processing unit 150 no longer determines whether the second battery unit 122 has been charged to the extent that its power level reaches the power level threshold but keeps turning on the second switch path so that the second battery unit 122 is fully charged with the external power (step S25), for example, charged to 100%.

Similarly, if the processing unit 150 determines that the power level of the first battery unit 121 does not exceed the power level threshold and that the power level of the second battery unit 122 exceeds the power level threshold, the processing unit 150 not only sends the first shutdown signal SD1 to sever the second switch path of the second selective conducting circuit 142 but also sends the first start signal SE1 to turn on the first switch path of the first selective conducting circuit 141 so that the first battery unit 121 is charged with the external power through the first switch path (step S26). In an embodiment, after step S26, the processing unit 150 no longer determines whether the first battery unit 121 has been charged to the extent that its power level reaches the power level threshold but keeps turning on the first switch path so that the first battery unit 121 is fully charged with the external power (step S27), for example, charged to 100%.

If the processing unit 150 determines that both the power level of the first battery unit 121 and the power level of the second battery unit 122 exceed the power level threshold, the processing unit 150 terminates the charging process (step S28) so that the first battery unit 121 and the second battery unit 122 are not charged with the external power even though the power transmitting end 110 still receives the external power.

In an embodiment of step S28, the processing unit 150 sends the first shutdown signal SD1 to sever the second switch path and sends the second shutdown signal SD2 to sever the first switch path, thereby terminating the charging process.

In an embodiment, before generating and sending the first start signal SE1 to the first selective conducting circuit 141 (or generating and sending the second start signal SE2 to the second selective conducting circuit 142,) the processing unit 150 not only generates and sends the second shutdown signal SD2 to the first selective conducting circuit 141 but also generates and sends the first shutdown signal SD1 to the second selective conducting circuit 142 to sever the first switch path and the second switch path, and then generates and sends the first start signal SE1 to the first selective conducting circuit 141 (or generates and sends the second start signal SE2 to the second selective conducting circuit 142) to prevent the first switch path and the second switch path from turning on simultaneously, but the present invention is not limited thereto.

In an embodiment, after detecting separation of the second battery unit 122 and the electronic device 100, the processing unit 150 generates and sends the first start signal SE1 to the first selective conducting circuit 141 so that the electronic device 100 keeps operating by the power of the first battery unit 121.

In an embodiment, the processing unit 150 detects whether the second battery unit 122 has separated from the electronic device 100, and the processing unit 150 generates and sends the first start signal SE1 to the first selective conducting circuit 141, upon detection of the separation of the second battery unit 122 and the electronic device 100, to turn on the first switch path so that the first battery unit 121 electrically connects with the power transmitting end 110.

In some embodiments, the second battery unit 122 has an ID pin Pi. When the second battery unit 122 is coupled to the electronic device 100, the processing unit 150 receives an ID signal Si sent from the second battery unit 122 through the ID pin Pi. Therefore, the processing unit 150 determines whether the second battery unit 122 has separated from the electronic device 100 according to whether it has received the ID signal Si of the second battery unit 122.

In an embodiment, the processing unit 150 comprises a first control circuit 151, a second control circuit 152, and a processing module 153. The first control circuit 151 is coupled to the first selective conducting circuit 141 and the second battery unit 122. The second control circuit 152 is coupled to the second selective conducting circuit 142. The processing module 153 is coupled to the first control circuit 151, second control circuit 152, first battery unit 121, and second battery unit 122.

The first control circuit 151 generates and sends the first start signal SE1 or the second shutdown signal SD2 to the first selective conducting circuit 141 according to a first control signal Sc1 and the ID signal Si of the second battery unit 122. In an embodiment, the first control circuit 151 comprises two transistors M3, M4, six resistors R1-R6, and one capacitor C1. Transistors M3, M4 are provided in the form of N-type transistors, but the present invention is not limited thereto.

The first end of transistor M3, the first end of transistor M4, the first end of resistor R3, and the first end of capacitor C1 are coupled to the control end of switch component M1 in the first selective conducting circuit 141. The second end of transistor M3, the second end of transistor M4, the second end of resistor R2, and the second end of resistor R6 are coupled to ground voltage GND. The control end of transistor M3 is coupled to the second end of resistor R1 and the first end of resistor R2. The control end of transistor M4 is coupled to the second end of resistor R5 and the first end of resistor R6. The second end of capacitor C1 and the second end of resistor R3 are coupled to the first end of the switch component M1. The first end of resistor R4 is coupled to a power supply voltage VDD. The second end of resistor R4 and the first end of resistor R5 are coupled to the ID signal Si of the second battery unit 122. The first end of resistor R1 is coupled to the first control signal Sc1.

If the control end of transistor M4 cannot receive the ID signal Si of the second battery unit 122, for example, when the second battery unit 122 separates from the electronic device 100, transistor M4 turns on, and its first end sends the first start signal SE1 to the control end of switch component M1, thereby allowing the first battery unit 121 to be electrically connected to the power transmitting end 110 through the first switch path of switch component M1. Conversely, if the control end of transistor M4 receives the ID signal Si of the second battery unit 122, transistor M4 remains off. At this point in time, a signal which the first control circuit 151 sends to the control end of switch component M1 in the first selective conducting circuit 141 depends on the first control signal Sc1. For instance, when the first control signal Sc1 is at a turn-on level, and transistor M3 turns on so that its first end generates and sends the first start signal SE1 to the control end of switch component M1, thereby allowing the first battery unit 121 to be electrically connected to the power transmitting end 110 through the first switch path of transistor M1. When the first control signal Sc1 is at a turn-off level, transistor M3 turns off so that its first end generates and sends the second shutdown signal SD2 to the control end of switch component M1, thereby allowing switch component M1 to sever the first switch path.

The second control circuit 152 generates and sends the second start signal SE2 or the first shutdown signal SD1 to the second selective conducting circuit 142 according to a second control signal Sc2. In an embodiment, the second control circuit 152 comprises one transistor M5 and three resistors R7-R9. The transistor M5 is provided in the form of an N-type transistor, but the present invention is not limited thereto.

The first end of transistor M5 and the second end of resistor R9 are coupled to the control end of switch component M2 in the second selective conducting circuit 142. The second end of transistor M5 and the second end of resistor R8 are coupled to ground voltage GND. The control end of transistor M5 is coupled to the second end of resistor R7 and the first end of resistor R8. The first end of resistor R9 is coupled to the first end of switch component M2. The first end of resistor R7 is coupled to the second control signal Sc2.

If the second control signal Sc2 is at a turn-on level, transistor M5 turns on so that its first end generates and sends the second start signal SE2 to the control end of switch component M2 so that the second battery unit 122 is electrically connected to the power transmitting end 110 through the second switch path of switch component M2. If the second control signal Sc2 is at a turn-off level, transistor M5 turns off so that its first end generates and sends the first shutdown signal SD1 to the control end of switch component M2, thereby allowing switch component M2 to sever the second switch path.

The processing module 153 detects the first battery unit 121 and the second battery unit 122. The processing module 153 generates the first control signal Sc1 and the second control signal Sc2 according to the state of the first battery unit 121 and the state of the second battery unit 122. For instance, if the voltage of the first battery unit 121 is higher than the voltage of the second battery unit 122 by the first voltage threshold, the processing module 153 generates the first control signal Sc1 with a turn-on level and the second control signal Sc2 with a turn-off level. For instance, if the voltage of the second battery unit 122 is higher than the voltage of the first battery unit 121 by the second voltage threshold, the processing module 153 generates the first control signal Sc1 with a turn-off level and the second control signal Sc2 with a turn-on level.

In an embodiment, the electronic device 100 further comprises a third selective conducting circuit 143. The third selective conducting circuit 143 is coupled to the power transmitting end 110, second selective conducting circuit 142, second voltage-controlled conducting circuit 132, and processing unit 150. The third selective conducting circuit 143 has a third switch path. The third switch path is disposed between the first end and the second end of the third selective conducting circuit 143. The third selective conducting circuit 143 is controlled by the processing unit 150 and determines whether to turn on the third switch path according to a signal sent from the processing unit 150. The first end of the third selective conducting circuit 143 is coupled to the first end of the second selective conducting circuit 142 and the second end of the second voltage-controlled conducting circuit 132. The second end of the third selective conducting circuit 143 is coupled to the power transmitting end 110. The control end of the third selective conducting circuit 143 is coupled to the processing unit 150. Therefore, the third switch path is disposed between the second selective conducting circuit 142 and the power transmitting end 110.

In an embodiment, the third selective conducting circuit 143 comprises one or more switch components M6. The description below is exemplified by the third selective conducting circuit 143 which comprises one switch component M6, but the present invention is not limited thereto.

The first end of switch component M6 is coupled to the first end of the switch component M2. The second end of switch component M6 is coupled to the power transmitting end 110. The control end of switch component M6 is coupled to the processing unit 150. The third switch path is disposed between the first end and the second end of switch component M6. The control end of switch component M6 controls the start or shutdown of the third switch path.

In an embodiment, the processing unit 150 generates and sends a third start signal SE3 to the control end of switch component M3 of the third selective conducting circuit 143 to turn on the third switch path upon detection that the second battery unit 122 is correctly coupled to the electronic device 100, but the processing unit 150 generates and sends a third shutdown signal SD3 to the control end of switch component M3 of the third selective conducting circuit 143 to sever the third switch path upon detection that the second battery unit 122 is incorrectly coupled to the electronic device 100.

In an embodiment, the third selective conducting circuit 143 further comprises diode D3, and diode D3 is coupled between the first end and the second end of switch component M3. Diode D3 has an anode coupled to the second end of switch component M3 and a cathode coupled to the first end of switch component M3. Diode D3 is a unidirectional conducting circuit; hence, diode D3 conducts current from its anode to its cathode. In some embodiments, diode D3 is a parasitic diode which results from a circuit process of switch component M3. Switch component M3 is provided in the form of a P-type transistor, but the present invention is not limited thereto. Switch component M3 is provided in the form of an N-type transistor or a transmission gate (TG).

In an embodiment, the processing unit 150 further comprises a third control circuit 154. The third control circuit 154 generates and sends the third start signal SE3 or the third shutdown signal SD3 to the third selective conducting circuit 143 according to a third control signal Sc3.

In an embodiment, the third control circuit 154 comprises one transistor M7, three resistors R10-R12, and capacitor C2. The transistor M7 is provided in the form of an N-type transistor, but the present invention is not limited thereto.

The first end of transistor M7, the first end of resistor R12, and the first end of capacitor C2 are coupled to the control end of switch component M6 in the third selective conducting circuit 143. The second end of transistor M7 and the second end of resistor R11 are coupled to ground voltage GND. The control end of transistor M7 is coupled to the first end of resistor R11 and the second end of resistor R10. The second end of capacitor C2 and the second end of resistor R12 are coupled to the first end of switch component M3. The first end of resistor R10 is coupled to the third control signal Sc3.

If the third control signal Sc3 is at a turn-on level, transistor M7 turns on so that its first end generates and sends the third start signal SE3 to the control end of switch component M6, thereby allowing the second switch path to be electrically connected to the power transmitting end 110. If the third control signal Sc3 is at a turn-off level, transistor M7 turns off so that its first end generates and sends the third shutdown signal SD3 to the control end of switch component M3, thereby allowing switch component M3 to sever electrical connection between the second switch path and the power transmitting end 110.

In an embodiment, the processing module 153 in the processing unit 150 generates the third control signal Sc3 according to the state of the second battery unit 122. For instance, if the processing module 153 detects that the second battery unit 122 is correctly coupled to the electronic device 100, the processing module 153 generates the third control signal Sc3 with a turn-on level. For instance, if the processing module 153 detects that the second battery unit 122 is incorrectly coupled to the electronic device 100, the processing module 153 generates the third control signal Sc3 with a turn-off level.

In conclusion, an electronic device, a discharging method for the same, and a charging method for the same, which are provided according to an embodiment of the present invention, have essential technical features described below. Two selective conducting circuits control a specified one of two battery units to undergo discharging and charging and thus enhance the efficiency of the two battery units. Two voltage-controlled conducting circuits allow the two battery units to be parallel-connected to a power transmitting end to undergo a discharging operation and thus ensure that at least one of the battery units is discharged through the voltage-controlled conducting circuits despite an ongoing switch between the selective conducting circuits or separation of one of the battery units from the electronic device, so as to maintain system stability of the electronic device. Furthermore, the electronic device, the discharging method for the same, and the charging method for the same, which are provided according to an embodiment of the present invention, are characterized in that the two battery units have equal battery capacity to allow a reduction in the required volume of the electronic device.

Although the present invention is disclosed above by preferred embodiments, the preferred embodiments are not restrictive of the present invention. Slight changes and modifications made by persons skilled in the art to the preferred embodiments without departing from the spirit of the present invention must be deemed falling within the scope of the present invention. Accordingly, the legal protection for the present invention should be defined by the appended claims.

What is claimed is:

1. An electronic device, comprising:
   a power transmitting end;
   a first battery unit;
   a second battery unit;
   a first voltage-controlled conducting circuit coupled between the first battery unit and the power transmitting end to electrically connect the first battery unit to the power transmitting end if the first battery unit has a higher voltage than the power transmitting end;
   a first selective conducting circuit coupled between the first battery unit and the power transmitting end to electrically connect the first battery unit to the power transmitting end according to a first start signal;
   a second voltage-controlled conducting circuit coupled between the second battery unit and the power transmitting end to electrically connect the second battery unit to the power transmitting end if the second battery unit has a higher voltage than the power transmitting end;
   a second selective conducting circuit coupled between the second battery unit and the power transmitting end to electrically connect the second battery unit to the power transmitting end according to a second start signal; and
   a processing unit for detecting a voltage of the first battery unit and a voltage of the second battery unit to selectively generate the first start signal and the second start signal,
   wherein the processing unit is configured to cause the first battery unit and the second battery unit to take turns discharging by alternatingly generating:
      the first start signal when the voltage of the first battery unit is higher than the voltage of the second battery unit by a first voltage threshold so that the first battery unit is discharged through the first selective conducting circuit, and
      the second start signal when the voltage of the second battery unit is higher than the voltage of the first battery unit by a second voltage threshold so that the second battery unit is discharged through the second selective conducting circuit.

2. The electronic device of claim 1 wherein the processing unit generates and sends a first shutdown signal to the second selective conducting circuit while generating the first start signal so that the second selective conducting circuit breaks the electrical connection between the second battery unit and the power transmitting end, and the processing unit generates and sends a second shutdown signal to the first selective conducting circuit while generating the second start signal so that the first selective conducting circuit breaks the electrical connection between the first battery unit and the power transmitting end.

3. The electronic device of claim 1, wherein the processing unit generates an alert signal if the voltage of the first battery unit drops to a predetermined voltage, with the predetermined voltage being higher than a lowest voltage of the second battery unit.

4. The electronic device of claim 1, wherein, after receiving a charging signal, the processing unit generates the first start signal or the second start signal according to a power level of the first battery unit and a power level of the second battery unit.

5. The electronic device of claim 4, wherein the processing unit generates the first start signal and the second start signal alternately according to the power level of the first battery unit, the power level of the second battery unit and a predetermined power level difference if both a power level of the first battery unit and a power level of the second battery unit are lower than a power level threshold and the processing unit receives the charging signal so that the first battery unit and the second battery unit alternately receive an external power from the power transmitting end.

6. The electronic device of claim 5, wherein the processing unit alternately generates the first start signal and the second start signal by a predetermined rule, and the predetermined rule requires that the first start signal be generated if the power level of the first battery unit is lower than or equal to the power level of the second battery unit so that the first battery unit is charged until the power level of the first battery unit is higher than the predetermined power level difference of the power level of the second battery unit, requires that the second start signal be generated if the power level of the first battery unit is higher than the predetermined power level difference of the power level of the second battery unit so that the second battery unit is charged until the power level of the second battery unit is equal to the power level of the first battery unit, and requires that the charging of the first battery unit and the second battery unit be finished if the power level of the first battery unit and the power level of the second battery unit are higher than the power level threshold.

7. The electronic device of claim 1, wherein the first voltage-controlled conducting circuit is a unidirectional current circuit for conducting current from the first battery unit to the power transmitting end, and the second voltage-controlled conducting circuit is a unidirectional current circuit for conducting current from the second battery unit to the power transmitting end.

8. The electronic device of claim 1, wherein the first battery unit is built in the electronic device, and the second battery unit is separably coupled to the electronic device.

9. The electronic device of claim 8, wherein the processing unit generates the first start signal upon detection of separation of the second battery unit and the electronic device.

10. The electronic device of claim 8, further comprising:
    a third selective conducting circuit coupled between the second voltage-controlled conducting circuit and the power transmitting end and coupled between the second selective conducting circuit and the power transmitting end to enable electrical connection between the second voltage-controlled conducting circuit and the power transmitting end and electrical connection between the second selective conducting circuit and the power transmitting end according to a third start signal, wherein, after detecting that the second battery unit is coupled to the electronic device, the processing unit generates the third start signal.

11. The electronic device of claim 1, wherein the processing unit processor is configured such that when an initial voltage of the first battery unit is higher than or equals an initial voltage of the second battery unit, the first start signal is generated.

12. A discharging method, comprising the steps of:
turning on a first voltage-controlled path according to a voltage between two ends of the first voltage-controlled path disposed between a first battery unit and a power transmitting end to discharge the first battery unit through the first voltage-controlled path;
turning on a second voltage-controlled path according to a voltage between two ends of the second voltage-controlled path disposed between a second battery unit and the power transmitting end to discharge the second battery unit through the second voltage-controlled path;
detecting a voltage of the first battery unit and a voltage of the second battery unit; and
discharging the first battery unit and the second battery unit in turns by alternatingly performing the following steps:
turning on a first switch path disposed between the first battery unit and the power transmitting end and severing a second switch path disposed between the second battery unit and the power transmitting end upon detection that the voltage of the first battery unit is higher than the voltage of the second battery unit by a first voltage threshold, thereby discharging the first battery unit through the first switch path; and
turning on the second switch path and severing the first switch path upon detection that the voltage of the second battery unit is higher than the voltage of the first battery unit by a second voltage threshold, thereby discharging the second battery unit through the second switch path.

13. The discharging method of claim 12, further comprising generating an alert signal if the voltage of the first battery unit drops to a predetermined voltage, with the predetermined voltage being higher than a lowest voltage of the second battery unit.

14. The discharging method of claim 12, wherein the first voltage-controlled path is a unidirectional current path for conducting current from the first battery unit to the power transmitting end, and the second voltage-controlled path is a unidirectional current path for conducting current from the second battery unit to the power transmitting end.

15. The discharging method of claim 12, wherein the first battery unit is built in an electronic device, and the second battery unit is separably coupled to the electronic device, and the discharging method further comprises turning on the first switch path upon detection of separation of the second battery unit and the electronic device.

16. The discharging method of claim 12, wherein the first battery unit is built in an electronic device, and the second battery unit is separably coupled to the electronic device, and the discharging method further comprises:
turning on a third switch path disposed between the second switch path and the power transmitting end upon detection that the second battery unit is coupled to the electronic device, thereby discharging the second battery unit through the second switch path and the third switch path; and
severing the third switch path upon detection of separation of the second battery unit and the electronic device.

17. The discharging method of claim 12, wherein when an initial voltage of the first battery unit equals or is higher than an initial voltage of the second battery unit, the first start signal is generated.

18. A charging method, comprising the steps of:
detecting a first battery unit and a second battery unit of an electronic device;
turning on a first switch path between the first battery unit and a power transmitting end and turning off a second switch path between the second battery unit and the power transmitting end if a power level of the first battery unit is not higher than a power level of the second battery unit by a predetermined power level difference so that the first battery unit receives an external power from the power transmitting end through the first switch path until the power level of the first battery unit is higher than the predetermined power level difference of the power level of the second battery unit; and
turning on the second switch path and severing the first switch path if the power level of the first battery unit is higher than the predetermined power level difference so that the second battery unit receives the external power from the power transmitting end through the second switch path until the power level of the second battery unit is equal to the power level of the first battery unit.

19. The charging method of claim 18, further comprising severing the second switch path and the first switch path upon detection that both the first battery unit and the second battery unit have a power level higher than a power level threshold.

20. The charging method of claim 19, further comprising turning on the second switch path and severing the first switch path if the first battery unit has a power level higher than the power level threshold and the second battery unit has a power level lower than the power level threshold, thereby allowing the second battery unit to receive, through the second switch path, the external power from the power transmitting end.

21. The charging method of claim 19, further comprising turning on the first switch path and turning off the second switch path if the power level of the first battery unit is lower than the power level threshold and the power level of the second battery unit is higher than the power level threshold, thereby allowing the first battery unit to receive, through the first switch path, the external power from the power transmitting end.

* * * * *